July 19, 1960

G. K. C. HARDESTY 2,945,313

POLYCHROMATIC SELECTIVE DISPLAY PANEL

Filed Aug. 29, 1958

INVENTOR.
G. K. C. HARDESTY

BY

B. L. Zangwill
ATTORNEYS.

July 19, 1960

G. K. C. HARDESTY 2,945,313

POLYCHROMATIC SELECTIVE DISPLAY PANEL

Filed Aug. 29, 1958

INVENTOR.
G. K. C. HARDESTY

BY

B. L. Zangwill
ATTORNEYS.

July 19, 1960

G. K. C. HARDESTY 2,945,313

POLYCHROMATIC SELECTIVE DISPLAY PANEL

Filed Aug. 29, 1958

INVENTOR.
G. K. C. HARDESTY

BY

*B. L. Zangwill*
ATTORNEYS.

July 19, 1960 G. K. C. HARDESTY 2,945,313
POLYCHROMATIC SELECTIVE DISPLAY PANEL
Filed Aug. 29, 1958 7 Sheets-Sheet 4

INVENTOR.
G. K. C. HARDESTY
BY
B. L. Zangwill
ATTORNEYS.

July 19, 1960  G. K. C. HARDESTY  2,945,313
POLYCHROMATIC SELECTIVE DISPLAY PANEL
Filed Aug. 29, 1958  7 Sheets-Sheet 6

INVENTOR.
G. K. C. HARDESTY
BY
*B. L. Zangari*
ATTORNEYS.

INVENTOR.
G. K. C. HARDESTY

United States Patent Office 2,945,313
Patented July 19, 1960

2,945,313

POLYCHROMATIC SELECTIVE DISPLAY PANEL

George K. C. Hardesty, P.O. Box 156, Mayo, Md.

Filed Aug. 29, 1958, Ser. No. 758,167

17 Claims. (Cl. 40—130)

(Granted under Title 35, U.S. Code (1952), sec. 266)

The invention described herein may be manufactured and used by or for the Government of the United States of America for governmental purposes without the payment of any royalties thereon or therefor.

This invention relates to illuminated display panels and indicators, and more particularly to polychromatic selective display indicators; that is, to indicators wherein separate and distinct colors are used for indicating various conditions to thereby warn and otherwise provide visual information to pilots of aircraft, crewmen of ships, surface or submarine, or the like.

The instant invention makes use of and broadens the utility of the principles of the Duo-Panel Edge Illumination System disclosed in applicant's copending application Serial No. 369,976, filed July 23, 1953 now Patent No. 2,886,911.

In applicant's copending application, Serial No. 369,976, filed July 23, 1953 for Duo-Panel Edge Illumination System, referred to above, there is described an invention which has for its object the provision of an improved panel edge illumination system that is particularly suitable in military equipment which incorporates a master control console and/or a centralized monitoring station. In applicant's copending application there is described a system that operates on the principle of transmission of light through a transparent plastic sheet or panel by total internal specular reflection to an indicia-bearing sheet or panel which is in poor optical contact with the adjacent surface of the first panel. This Duo-Panel arrangement provides an extremely efficient system since little or no light is lost.

An object of the present invention is to provide a multi-colored indicator utilizing the above Duo-Panel system for light transmission.

Another object of this invention is to provide an indicator wherein the attention of an observer is attracted at least in part by a change in color of the graphic material displayed and wherein the color is that peculiar to a spectral band of energy rather than to a mixture of complex spectral compositions requiring the observer to have standard color perception for correct interpretation.

A further object of this invention is to provide an indicator capable of selectively displaying groups of colored indicia wherein the principle of selective display is physical and light of one spectral band is allowed to pass through one set of indicia but forbidden transmission through another set or sets.

Another object of this invention is to provide a colored indicator utilizing the property of a solid plastic element to efficiently distribute light from one source yet to accept the entry of light from at least two alternate sources.

As stated hereinbefore, an object of this invention is to broaden the utility of illuminable control panels particularly of the Duo-Panel type. For example, various military, and commercial, electronic equipment require that certain graphic information on their control panels be selectively illuminated as the controls are set to new positions—changing a range-selector should result in the change in numericals associated with the scale. With the subject invention, it is possible to employ at least three range scales and have them differ in color as well as in numerical values or the like as the selector switch is positioned. The scales or other indicia can be superimposed or intermingled graphically but each will be unambiguously displayed and in a significant color.

A zone of the indicia panel of a Duo-Panel system, for example, may be provided with selectively illuminated designations without loss of efficiency by inserting a separately lamped section of light-conducting panel into an opening cut into the principal light-conducting panel of the Duo-Panel assembly. Alternately, the separately lamped section can be assembled behind the principal light-conducting panel. Those portions of the indicia panel that are involved in this selective display need not be physically integral with the principal indicia panel but may be inserts or tabs suitably positioned and retained therein.

In one simplified embodiment of the invention the indicia panel of a Duo-Panel indicator is formed with a mosaic design of discrete pieces of colored glass, plastic or the like inlaid therein in intermingled fashion, with the pieces spelling words, for example, ON in red and OFF in blue. The light-transmitting panel is provided with at least two miniature tungsten lamps, with one such lamp having a red filter thereon and the other lamp provided with a blue filter. As one lamp is turned on and the other is simultaneously turned off, the word ON in red is replaced by the word OFF in blue. Other combinations, for example, ON-CAUTION-OFF in red, yellow and green, respectively, may be formed through the use of three lamps and suitable filters. The two, or three, color indicia panel can have a translucent or ground surface or be assembled behind a neutral filter sheet to avoid ambiguity of signal in strong ambient light. The colored mosaic can be fabricated from discrete pieces or may be a colored transparency prepared quickly and economically by photographic process.

In a second embodiment of the invention, suitable sheet filters of the desired colors may be inserted between the light-conducting panel and the indicia panel. The light-conducting panel is again provided with the required number of lamps, each equipped with a color filter, the indicia panel is formed with the desired indicia, for example, PORT and STB'D thereon in transparent or translucent material and to avoid ambiguity of signal in strong ambient light, the indicia may be assembled behind a neutral filter sheet. By turning one light on and the other off, the word PORT in red, for example, is replaced by the abbreviated word STB'D in blue. As alternative to this second embodiment, either the filters around the lamps or the sheet filters between the panels may be eliminated, in either of which cases the words PORT and STB'D would be fabricated in the red and blue color, respectively, or the lamps may remain energized and the filters shifted to give the same effect of different color indicia. This second embodiment of the invention may be adapted to solve various design problems in the general application of Duo-Panels of control consoles and may be equipped with suitable mechanical means for conveniently shifting the color filters. A push-pull, two-section, cylindrical filter, for example, functions very well in an illuminated "graphic display panel"; a "graphic display panel" being a portrayal of circuit connections or the like that is changed by manual operation and serves as a "memory."

In a third embodiment of the invention, the indicia panel is fabricated from a number, depending upon the colors desired, of different color plastic filter sheets or plates. The light-conducting panel is provided, as hereinbefore, with a like number of lamps each with a color filter corresponding to the color of one of the sheet filters. The sheet filters are arranged in superimposed relation in front of the light-conducting panel. However, before the sheet filters are so superimposed, the desired indicia are cut into the sheets. For example, say a two-color indicator is to be provided for a gun, bomb or torpedo unit, and assume that the display is to indicate the condition of the unit, such as, READY to be fired or FIRED, and that READY is to be indicated by blue and FIRED by red. This red and blue combination is fabricated by cutting or engraving the word READY and an identification of the unit in the red stock and cutting the word FIRED and the identification in the blue stock. Then the identification, such as, NO. 1 UNIT is formed on a third or neutral sheet, the obverse sheet of the indicia panel. Now then, with the three sheets of the indicia panel stacked and located in front of the light-conducting panel and with the lamp equipped with the blue filter energized, light from such lamp passes from the light-conducting panel into and through the blue filter sheet, through the openings forming the word READY in red filter sheet to thereby illuminate the word READY in blue and the identification also in blue on the obverse surface of the indicia panel. Likewise, with the lamp equipped with the red filter energized and the blue-filtered lamp extinguished, light passes through the openings FIRED in the blue filter sheet, through the red filter sheet to thereby illuminate the word FIRED in red and the identification also in red on the obverse surface of the indicia panel. This third embodiment of the invention can be adapted to a three-color indicator by laminating three primary colors to make up a three-condition stock, say red, yellow and blue, or red, green and blue, with primary color exitation from lamps equipped with suitable filters.

Where maximum interest lies in a series of selective symbol displays, as in a submarine hull opening panel, an aircraft landing gear position panel, or similar vital function monitoring displays, it may be preferred to employ a special purpose illuminating assembly in place of the more conventional light-transmitting panel of the more conventional light-transmitting panel of the other embodiments of this invention. A fourth embodiment of the instant invention incorporates such an illuminating assembly.

This fourth embodiment of the instant invention is capable of considerable variation depending upon the effects desired. In one adaptation, the light-transmitting member is in the form of a rectangular block of transparent, light-conducting plastic having, for example, three cylindrical bores extending therethrough, each of which bores is lined with a cylindrical optical filter in the opposite ends of which is located a miniature lamp. One face of the block, the exit face, is sanded for transmission of light therethrough to an indicia panel position adjacent and out of optical contact with such face. The other five faces of the light-transmitting block are silvered for reflection of light to and through the sanded face.

In another adaptation of this fourth embodiment of the invention, three triangular transparent plastic prisms form a light-transmitting block, with the three prisms assembled into a rectangular block but with adjacent parallel faces of the prisms not in optical contact one with the others. Each of the three prisms is formed with a bore extending therethrough for the reception of a lamp or a pair of lamps, and each bore is lined with a color filter. The surfaces of the prisms are suitably polished, mirrored and/or sanded, depending upon whether the individual surface is an entry, exit or a totally or partially reflecting surface, as described in detail hereinafter. With this assembly of prisms, use is made of the property of a solid plastic element to efficiently distribute light from one source yet to accept the entry of light from at least two alternate sources. The indicia panel of this fourth embodiment may follow the various principles of the indicia panels of the other three embodiments, which also are described in detail hereinafter.

Thus, in each of the preferred embodiments of this invention, principles and advantages of applicant's Duo-Panel illumination system disclosed in applicant's copending application Serial No. 369,976, referred to above, are effectively used, the utility of the system is broadened and, with applicant's novel color combinations, the effects do not require standard color perception on the part of an observer—only that his eyes respond to energy over the spectral range employed. The principle of operation is physical and light of one spectral band is allowed to pass through one set of indicia but forbidden transmission through another set or sets. In common, each of the several embodiments selectively displays graphic material in one of several colors coincident with the selective energizing of one of several light sources in a common light-transmitting member, and/or coincident with the shifting of one or more of several color optical filters.

The invention, together with the above and other objects and advantages thereof, is set forth in more technical detail in the following description and accompanying drawings in which like reference characters designate like parts throughout the several views thereof and wherein.

Figure 2:
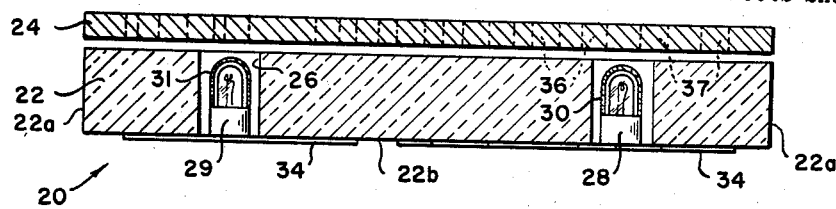
Fig. 2 is a transverse section taken substantially on line II—II of Fig. 1, with the panels assembled.
Figure 1:
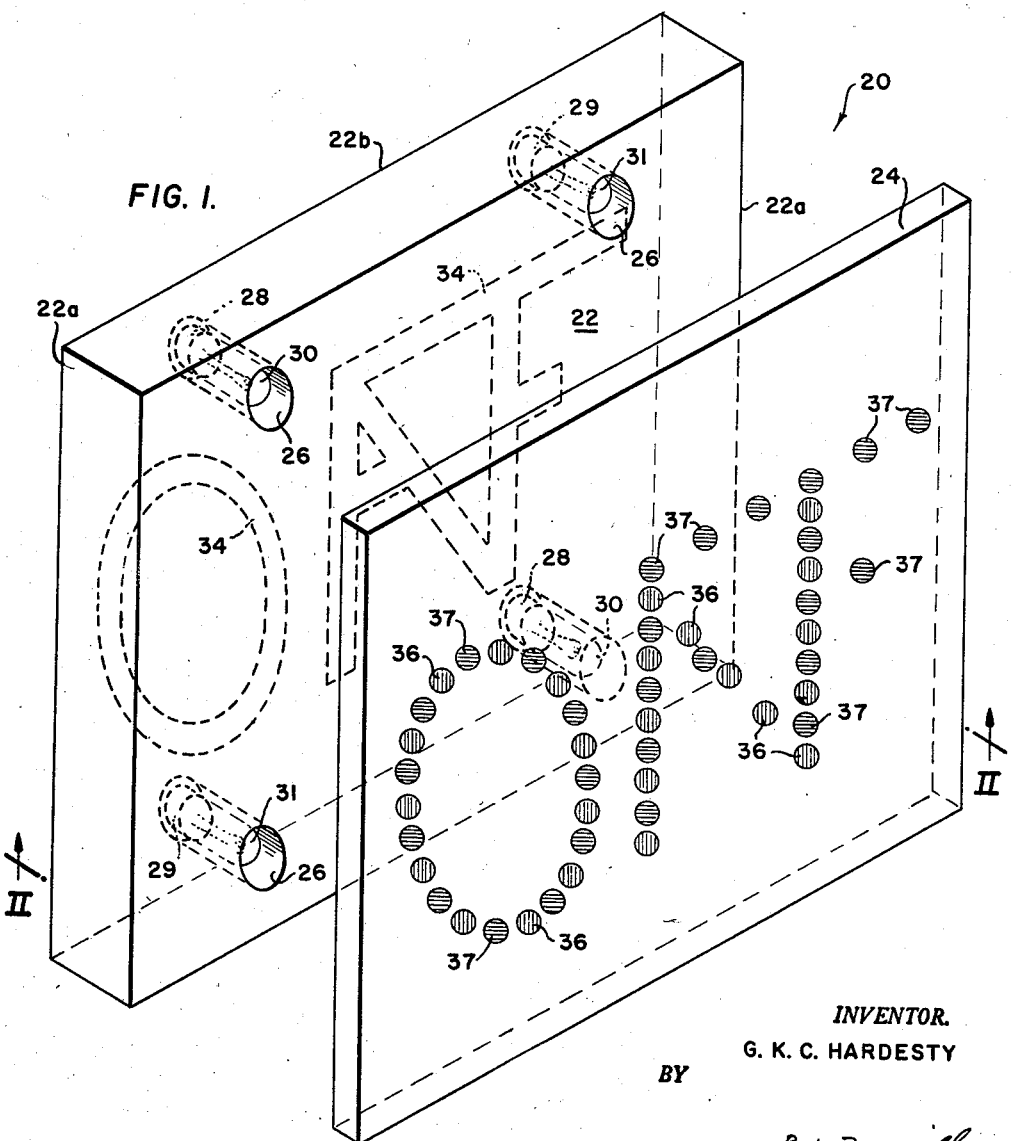
Fig. 1 is an exploded front perspective view of an illuminated panel assembly incorporating a first embodiment of the present invention.

Referring now to the drawings, first to Figs. 1 and 2, wherein there is shown a first embodiment of the invention in the form of a two-color panel or indicator. The structure designated generally by reference numeral 20, includes a panel or light-transmitting member 22 made of a highly transparent plastic. The light-transmitting panel 22 comprises a flat highly transparent sheet or plate of suitable size, having its front and back surfaces in parallel relation to each other and preferably polished to provide smooth optical surfaces. The light-transmitting member is preferably fabricated from an acrylic resin or methyl methacrylate plastic material of the thermoplastic type such as, for example, commercial "Plexiglas" or "Lucite."

Superimposed on the light-transmitting panel is an indicia-bearing panel or lamination 24, made of an opaque material. As shown in Fig. 2, the indicia panel is optically separated from the light-transmitting panel by an air space, which space is exaggerated in the drawings. Also, the optical separation may be by optically insignificant point or line contact between interfaces of the two panels.

The light-transmitting panel is formed with four cylindrical bores 26 therein for the reception of two pairs of miniature tungsten lamps 28 and 29, respectively, which lamps are supplied with electric current by suitable conductors, not shown, and which conductors are in an ON and OFF circuit of an electronic or mechanical component, not shown, with which the indicator is used. Two pairs of cylindrical optical filters 30 and 31 surround the lamps, with the filters 30 being of a type that will pass or transmit only a distinctly red band of the visible spectrum, hereinafter referred to as red filters, and with the filters 31 being of a type that will pass only a distinctly blue band of the spectrum, hereinafter referred to as blue filters.

The four edge surfaces 22a of light-transmitting panel 22 may be clear, polished surfaces or they may be first metalized for improved reflection and then coated with a black paint or the like to prevent light leakage. The rear or reverse surface 22b of the light-transmitting panel may be likewise polished and/or metallized and painted. However, on the rear surface, such coating is omitted or removed at selected locations and, in its place, the panel is coated with a light-diffusing material 34, such as a white paint, which diffusing material is preferably in the geometric form of or it spells out the indicia on the indicia panel, as described hereinafter. In the specific embodiment illustrated in Figs. 1 and 2, the light-diffusing material 34 spells out the words ON and OFF with the O common to the two words and the N and FF intermingled, as shown.

The indicia panel 24 is bored or drilled to provide a plurality of spaced openings extending from front to rear of the panel and which openings form the letters O, N and FF, with the letters N and FF intermingled in the manner shown. Assuming, for example, that the word ON is to be illuminated in red and the word OFF in blue, alternate openings in the indicia panel are then filled with mosiac pieces of red and blue glass, plastic or the like. For purpose of illustration and identification, the red mosaic pieces 36 are vertically hatched and the blue pieces 37 are horizontally hatched.

In operation of this first specific embodiment of the invention, assuming, for example, that the lamps 28 and 29 are in an electric circuit with an electronic or a mechanical component that is desired to be monitored and that such component is equipped with an ON and OFF switch, with the switch in the ON position, lamps 28 are energized and lamps 29 de-energized so that light rays pass from lamps 28 through the red filters 30 into and through the light-transmitting panel 22 wherein certain of the light rays are picked up by the light-diffusing material 34 on the rear of the light-transmitting panel and diffuse reflected through the front surface of the light transmitting panel into the indicia panel 24, wherein the the light rays from the red filters 30 are passed or transmitted by the red mosaic pieces 36 and are blocked or forbidden transmission by the blue mosaic pieces 37; thus the word ON is illuminated in red. Conversely, with the switch in the OFF position the lamps 29 are energized and lamps 28 de-energized, so that now light rays pass through the blue filters 31 into and through the light-transmitting panel wherein certain of the rays are again diffuse reflected by the material 34 into the indicia panel, wherein the light rays from the blue filters are passed or transmitted by the blue mosaic pieces 37 and are blocked or forbidden transmission by the red mosaic pieces 36; thus the word OFF is illuminated in blue.

Other color combinations, say ON-CAUTION-OFF in red, yellow and green, respectively, are obtainable, through the use of three lamps equipped with suitable filters.

The indicia panel may have a translucent or ground surface or be assembled behind a neutral filter sheet, not shown, to avoid ambiguity of signal in strong ambient light. The color mosaic can be fabricated from discrete pieces, as shown, or may be a colored transparency readily prepared by photographic process. The indicia need not be intermingled fractional pieces but may be in displaced areas, and the indicia filtering means may be in sheet form, as shown in the second embodiment of the instant invention.

Figure 3:
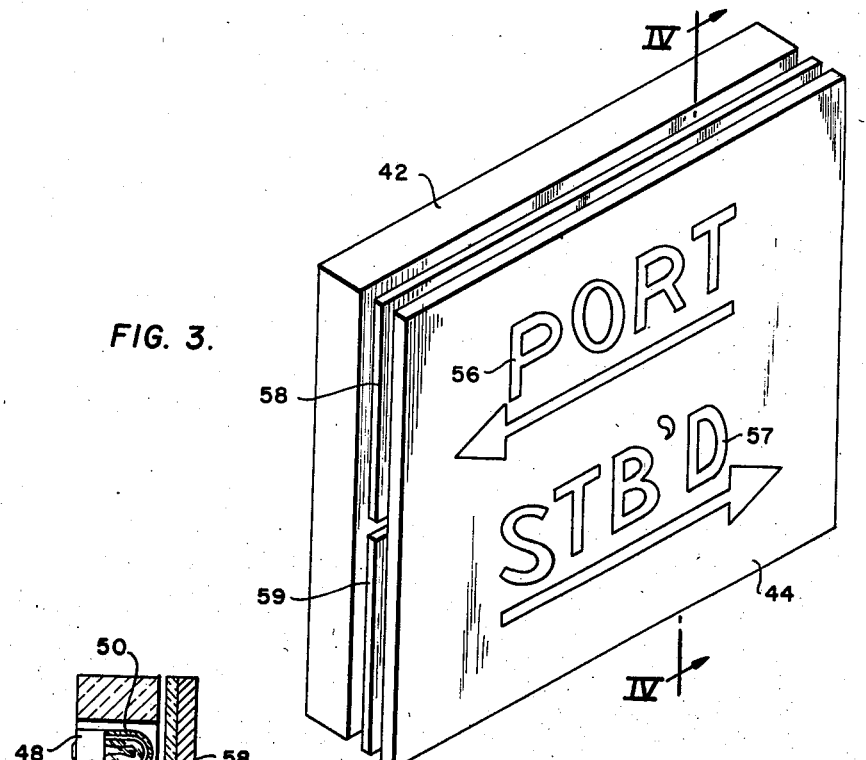
Fig. 3 is a front perspective view, generally similar to Fig. 1, and showing a panel assembly incorporating a second embodiment of this invention with the several panels separated for clarity of illustration.
Figure 4:
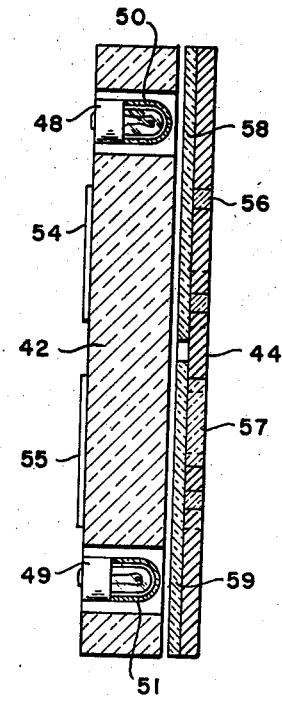
Fig. 4 is a transverse section taken substantially on line IV—IV of Fig. 3.

Referring now to Figs. 3 and 4 of the drawings, wherein a second specific embodiment or adaptation of the instant invention is shown, here the light-transmitting panel 42 is the same as panel 22 of the first embodiment and there are two pairs of lamps 48 and 49, only one lamp of each pair is shown in Fig. 4, which lamps are equipped with red and blue filters 50 and 51, respectively. The light-diffusing material 54 and 55 on the back or reverse surface of the light-transmitting panel may spell out the indicia on the indicia panel 44, or they may be in the form of two rectangular patches of the same overall size as that of the indicia.

The indicia panel 44, optically separated from panel 42, is generally similar to indicia panel 24 of the first embodiment, except for the indicia. The indicia 56 and 57, which in this instance spell out the word PORT and the abbreviation STB'D, may be of translucent or transparent material and the letters may be inlays in the panel, as shown. Assuming that PORT is to be illuminated in red and STB'D in blue, a red sheet or plate filter 58 is located behind the word PORT between the indicia panel and the light-transmitting panel, and a blue filter 59 is located behind the abbreviation STB'D. As shown in Fig. 4, the filter sheets 58 and 59 are optically separated from the light-transmitting panel 42.

The operation of the second embodiment is generally similar to that of the first embodiment, described hereinbefore. That is, with the pair of lamps 48 energized and lamps 49 de-energized, light rays pass from lamps 48 through the red filters 50 into and through the light-transmitting panel 42 wherein certain of the light rays are intercepted or picked up by the light-diffusing material 54 and 55 on the back of the panel and are diffuse reflected through the front of the light-transmitting panel toward the indicia panel. As before, the light rays striking the red filter 58 behind the indicia, PORT, are passed or transmitted through the red filter into the indicia to thereby illuminate PORT in red; whereas, light rays striking the blue filter 59 are blocked or refused transmission so that only the indicia PORT is illuminated. Conversely, with the pair of lamps 49 energized and lamps 48 de-energized, light rays from lamps 49 pass through the blue filters 51 into and through the light-transmitting panel wherein again certain of the light rays are diffused reflected out through the front surface of the panel toward the indicia panel. Now, certain light rays are transmitted through the blue filter 59 and other rays are blocked by the red filter 58 so that only STB'D is illuminated and in blue.

With this second embodiment of the invention, as with the first embodiment described hereinbefore and the other embodiments described hereinafter, the color filters surrounding or otherwise cooperating with the lamps, and/or the color filters between the panels may be mechanically shifted by suitable mechanism, not shown, to obtain red, blue or other light and to effect a signal change with or without shifting the lamps on and off.

Figure 5:
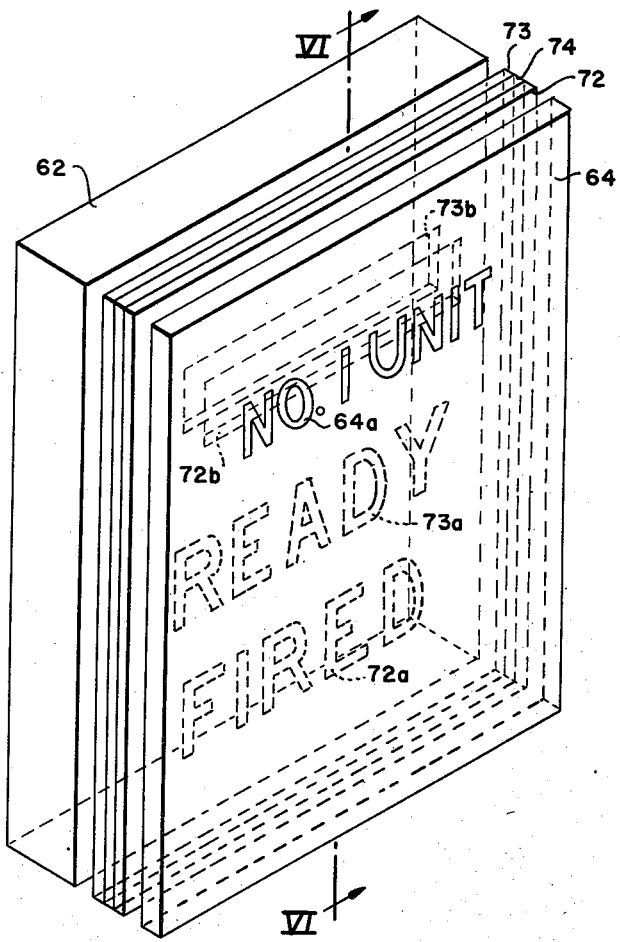
Fig. 5 is an exploded front perspective view showing a panel assembly incorporating a third embodiment of this invention.
Figure 6:
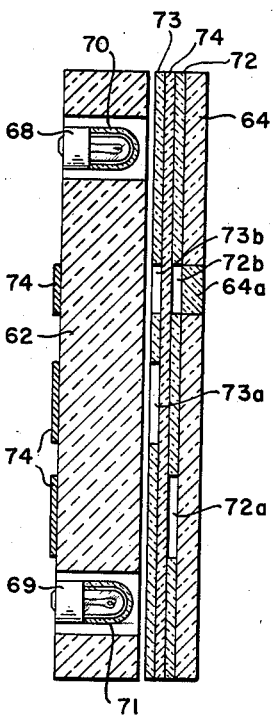
Fig. 6 is a transverse section taken substantially on line VI—VI of Fig. 5.

Referring now to Figs. 5 and 6 of the drawings, wherein a third embodiment of the invention is illustrated, here again the light-transmitting panel 62 is generally the same as panels 22 and 42 of the first and second embodiments and, as shown in Fig. 6, there are two pair of lamps 68 and 69 equipped with red and blue filters 70 and 71, respectively. For clarity of illustration, the lamps are omitted in Fig. 5. Patches of light-diffusing material 74 are placed on the back or reverse surface of the light-transmitting panel in line with the indicia on the indicia panel.

The indicia panel 64 is generally similar to panel 44 of Figs. 3 and 4 insofar as materials are concerned. However, with the panel illustrated in Figs. 5 and 6 the indicia comprise NO. 1 UNIT, in clear uncolored material inlaid in the obverse surface of the indicia panel, READY, in blue, and FIRED, in red in a laminated filter assembly, which filter assembly is located between the light-transmitting panel and the indicia panel. This filter assembly comprises a blue filter sheet or plate 72, a red filter sheet or plate 73 and a neutral filter sheet 74 sandwiched therebetween. This red and blue combination is fabricated by cutting, engraving or stamping the word READY in the red filter, as at 73a Fig. 6, and the word FIRED in the blue filter as at 72a and a blank for the indicia NO. 1 UNIT is cut from both the blue and red filters as at 72b and 73b. The filters are then arranged in the manner shown in Fig. 6, with the openings in the filters in line with the respective indicia formed on the assembly including the obverse surface of the indicia panel.

In operation of the Figs. 5 and 6 embodiment, with the three filter sheets stacked in the manner shown and located in front of the light-conducting panel out of optical contact therewith, and with the lamps with the blue filters energized, light from such lamps passes from the light-conducting panel through the openings forming the word READY in the red filter sheet, through the neutral filter 74 and through the blue filter sheet 72 to thereby illuminate the word READY in blue which is seen on the obverse surface of the indicia panel. Likewise, with the lamps equipped with the red filters energized and the blue-filtered lamps extinguished, light passes through the red filter sheet 73, through the neutral filter 74, through the openings 72a forming the word FIRED in the blue filter sheet to thereby render the word FIRED in red visable on the obverse surface of the indicia panel. The indicia, NO. 1 UNIT, is illuminated on the obverse surface of the indicia panel when either the red or the blue lamps are energized. This third embodiment of the invention can be adapted to a three-color indicator by eliminating the neutral filter and laminating three primary colors to make up a three-condition stock, say red, yellow and blue, or red, green and blue, with primary color excitation from lamps equipped with suitable filters.

Figure 7:
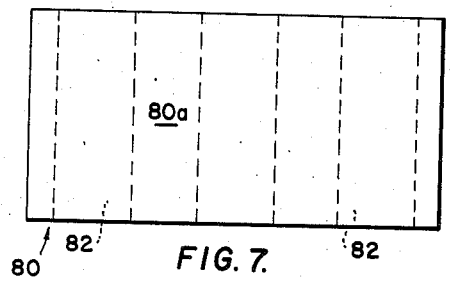
Fig. 7 is a front elevational view of a light-conducting block utilized in a fourth embodiment of the invention.
Figure 8:
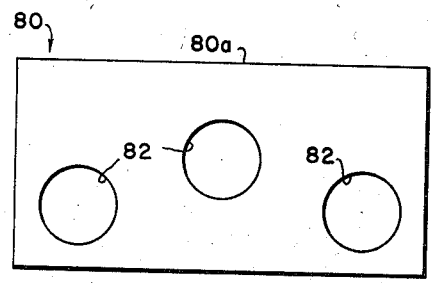
Fig. 8 is a side view of the block shown in Fig. 7.

Referring now to Figs. 7 and 8 of the drawings, wherein there is shown a light-transmitting element adapted for use with a fourth embodiment of the invention. Here the light-transmitting element 80 comprises a rectangular block of transparent, light-conducting plastic, such as commercial "Plexiglas" or "Lucite," having opposite faces thereof parallel and polished to provide smooth optical surfaces and with all except the front or obverse surface 80a coated first with a reflecting material and then with an opaque paint or the like to improve the reflecting surfaces and prevent light leakage. The obverse surface 80a may be sanded for transmission of light therethrough. The light-transmitting block 80 is formed with three transverse, cylindrical bores 82 therein for the reception of three pairs of miniature tungsten lamps, not shown, which lamps are equipped with color filters, as described in detail hereinafter. The light-transmitting block 80 is adapted for use with the indicator shown in Figs. 13–15, as described hereinafter.

Figure 9:
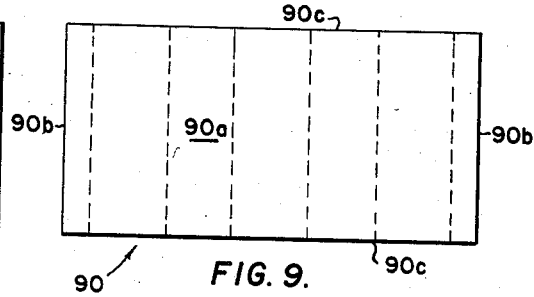
Fig. 9 is a front elevational view of an assembly of three light-conducting prisms utilized as an alternate for the light-conducting block of Figs. 7 and 8.
Figure 10:
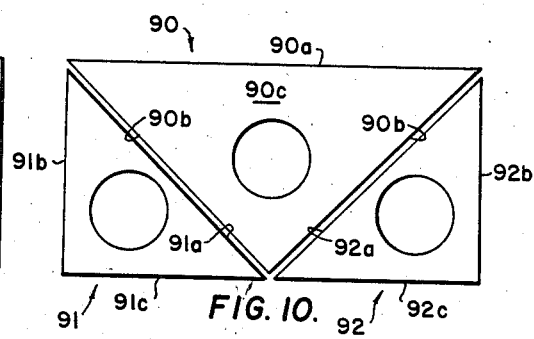
Fig. 10 is a side view of the block assembly shown in Fig. 9.

In Figs. 9 and 10 there is shown an assembly of light-conducting prisms adapted for use with the fourth embodiment of the invention as an alternate for the light-conducting block of Figs. 7 and 8. As shown in Figs. 9 and 10, the assembly of light-conducting prisms comprises three right triangular prisms 90, 91 and 92, each provided with a transverse, cylindrical bore therein for the reception of a pair of tungsten filament lamps equipped with suitable filters, not shown. The principal prism 90 has a front or obverse surface 90a sanded or otherwise treated so as to collimate and transmit light rays therethrough, a pair of rear surfaces 90b polished for entrance of light into the prism and for reflecting internal light and a pair of mirrored side surfaces 90c for reflecting light therefrom. The two auxiliary prisms 91 and 92 each have sanded exit surfaces 91a and 92a parallel with and out of optical contact with the adjacent faces 90b of the principal prism, and each of the remaining faces 91b, 91c and 92b, 92c, respectively, of the auxiliary prisms are mirrored for reflection of light thereby. These mirrored surfaces may be coated with a black opaque paint or the like for elimination of light leakage.

With this arrangement of light-transmitting prisms, as will be described in detail hereinafter, certain light rays from the lamp or lamps in prism 90 pass from the lamps directly to and through the obverse surface 90a, other light rays strike the polished surfaces 90b and are reflected back into the prism and eventually find their way to the obverse surface 90a by which surface the light rays are collimated by the sanded obverse surface and transmitted therethrough. In like manner, light rays that strike the mirrored surfaces 90c of the principal prism are reflected back into the prism and eventually find their way to the obverse surface 90a for transmission therethrough. With the auxiliary prisms 91 and 92, certain light rays pass directly from the lamps in such prisms through the prisms to and through the sanded surfaces 91a and 92a and into the principal prism. Other light rays which strike the mirrored surface 91b, 91c and 92b and 92c are reflected back into the auxiliary prisms and exit through the sanded surfaces 91a and 92a into and through the sanded surfaces 91a and 92a into and through the principal prism. That is, substantially all light from the lamps in the principal prism 90 is collimated by the sanded, obverse surface of this prism and transmitted therefrom to an indicia panel or the like, and in addition, substantially all light from the two auxiliary prisms 91 and 92, exit therefrom into and through the sanded, obverse surface of the principal prism. Thus, the principal prism efficiently distributes light from its own lamps and accepts and distributes light from the lamps of the two auxiliary prisms.

Figure 11:
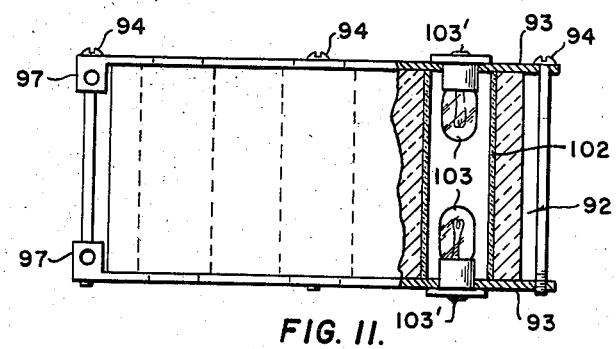
Fig. 11 is a front elevation, partly in section, and showing the prisms of Figs. 9 and 10 assembled in a frame.
Figure 12:
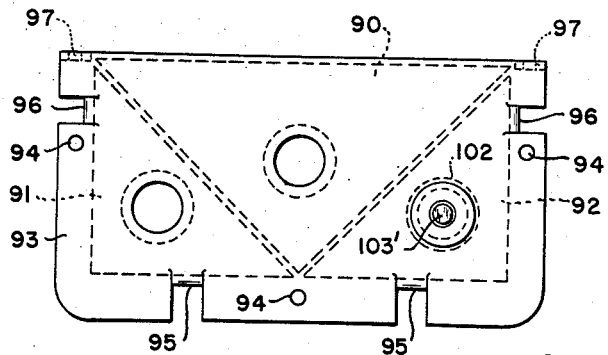
Fig. 12 is a side elevational view of the assembly shown in Fig. 11.
Figure 13:
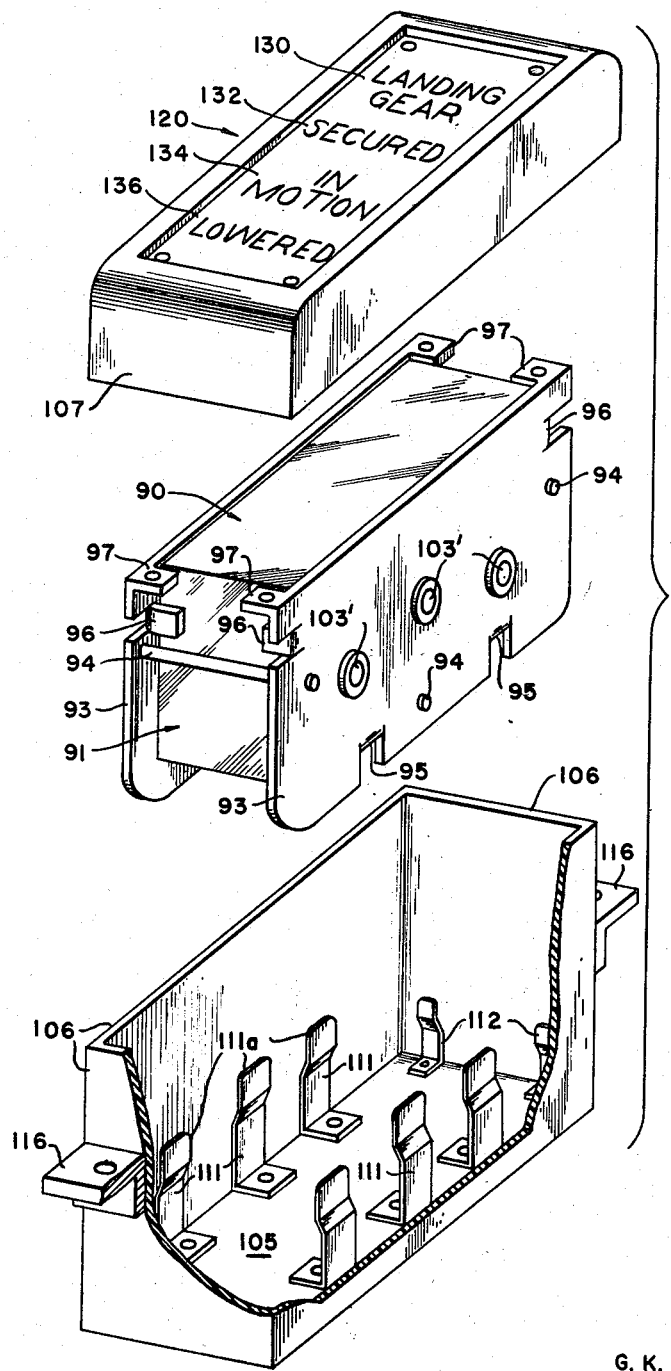
Fig. 13 is an exploded perspective view of an indicator illustrating a practical adaptation of the fourth embodiment of the invention.

Figs. 11–15 illustrate a practical adaptation of the light-transmitting prism arrangement of Figs. 9 and 10, or, as an alternate, the solid light-transmitting member of Figs. 7 and 8. As shown in Figs. 11 and 12, the prisms 90, 91 and 92 are assembled and held in optical spaced relation between a pair of electrical conducting frame members 93, which frame members are clamped in spaced relation by three screws 94, with the prisms therebetween. The frame members are substantially identical except for right and left handedness and as shown in Figs. 12 and 13 are formed with a first pair of tabs 95 that support the prisms at the bottom, a second pair of tabs 96 that limit end movement of the prisms, and a third pair of tabs or brackets 97 for securing a cover member to the assembly, as described hereinafter. The interfaces 90b of prism 90 and 91a and 92a of prisms 91 and 92 are optically separated by suitable means, not shown.

Figure 14:
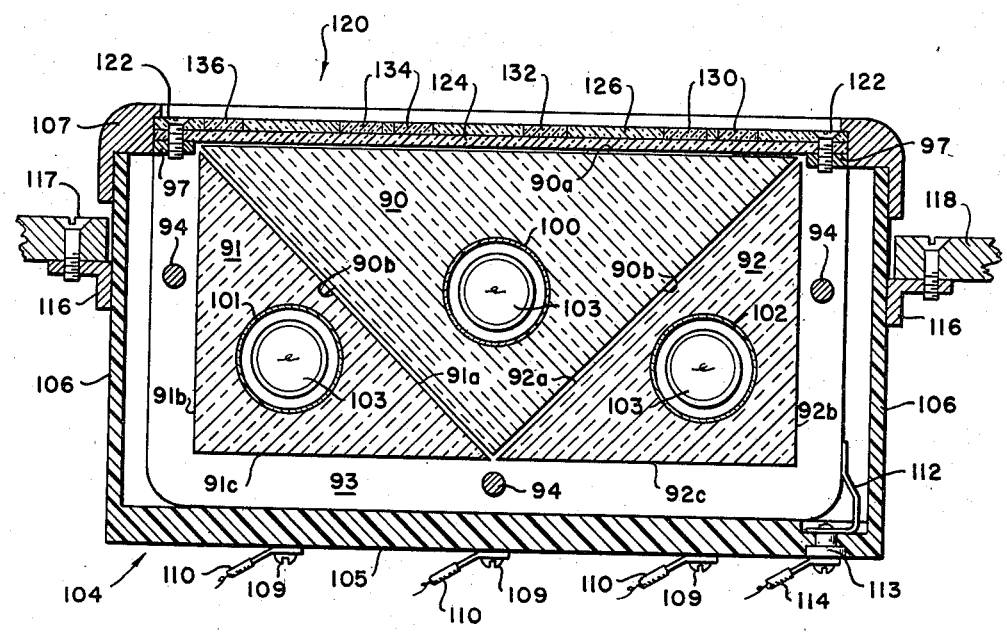
Fig. 14 is a longitudinal section through the indicator of Fig. 13 assembled.
Figure 15:
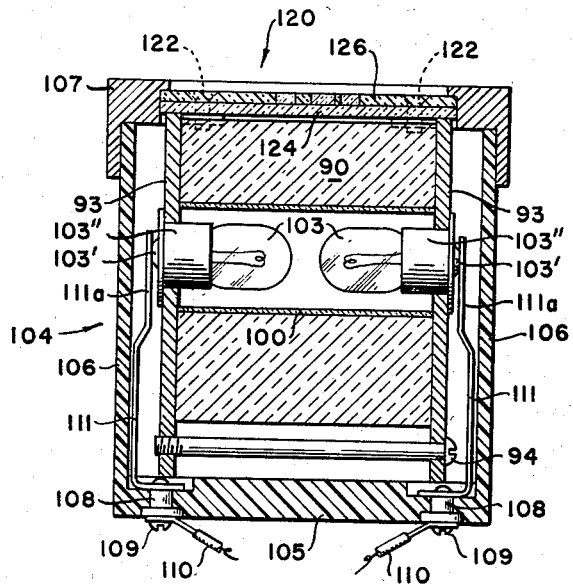
Fig. 15 is a transverse section through the indicator of Fig. 13.

As shown in Figs. 14 and 15, the prisms 90, 91 and 92 are equipped with cylindrical color filters 100, 101 and 102, for example, red, blue and yellow, respectively, and a pair of tungsten filament lamps 103 is located within each of the filters. The lamps are connected in electric circuits that lead to and from a component to which the indicator assembly is to be associated, as described hereinafter.

The assembly of prisms, electric conducting frames and lamps is encased within a housing or terminal box 104 made of non-conducting plastic material, such for example as Bakelite, and formed with a bottom 105, end and side walls 106 and a removable cover 107, which cover forms a frame for an indicia panel. Three pairs of electrical terminals 108 (Fig. 15) are supported by and extend through the bottom 105 of the housing. Each terminal is provided with a screw 109 for attaching a lead 110 from a component with which the indicator is associated. Each of the terminals 108 is provided with a resilient, current conducting member 111 having a flat portion 111a for contact with a center terminal 103′ of the lamps. The other or barrel terminal 103″ of the lamps is in electrical contact with the respective frame members 93, which frame members form part of the electric circuit and are connected in the circuit by a pair of conductors 112, which in turn are connected to a pair of terminals 113 located in the bottom of the housing at the right hand end thereof (Figs. 13 and 14) and which terminals have leads 114 leading back to the component. Thus, it is seen each of the lamps has a separate conductor 111 leading thereto and the circuit through the lamps is completed by the frame members 93. With proper switching arrangement, Fig. 16, the lamps may be selectively energized and deenergized as desired.

The indicator assembly, including the housing, light-transmitting prisms, color filters, lamps, electrical conductors, and indicia-carrying covers, shown in Figs. 13 thru 15, may be used as a separate indicator, or it may form a component of a master control console system and/or a centralized monitoring station; in which latter case, the housing 104 may be provided with a pair of brackets 116 for attachment, as by screws 117, within a suitable opening in the principal panel of the system, which principal panel is fragmentarily shown at 118 in Fig. 14.

The indicia panel, indicated generally by reference numeral 120, is contained within and framed by the cover 107 of the housing. The indicia panel is retained within the cover and the cover is retained on the housing by four screws 122 which are threaded into the brackets 97 at opposite ends of the frame members 93 (Fig. 14). The indicia panel may be constructed in accordance with the principles set forth hereinbefore with reference to the other specific embodiments of the invention. That is, the indicia may be formed of discrete or mosaic pieces, as in the Figs. 1 and 2 embodiment; the indicia may be formed of uncolored inlays with suitable color filters therebehind, as in the Figs. 3 and 4 embodiment; or, they may be formed of color filter laminations as shown in Figs. 5 and 6 embodiment.

As shown in Figs. 13 and 14, the indicia panel, indicated generally by reference numeral 120, comprises an inner panel 124 which may be made of a light diffusing material, and an outer panel 126 fabricated of an opaque material. Inlaid within the outer panel 126 are the indicia. The arrangement and color of the indicia is optional, depending upon the use to be made of the display. However, for purpose of illustration and as shown in Fig. 13, the indicia comprise the words LANDING GEAR in colorless glass or plastic, SECURED in blue, IN MOTION in yellow and LOWERED in red. The indicia are shown in Fig. 14 as inlays and are indicated by reference numerals 130, 132, 134 and 136, respectively. So as to avoid ambiguity of signal in strong ambient light, the obverse surface of the indicia panel may be covered with a neutral filter sheet, not shown.

Figure 16:
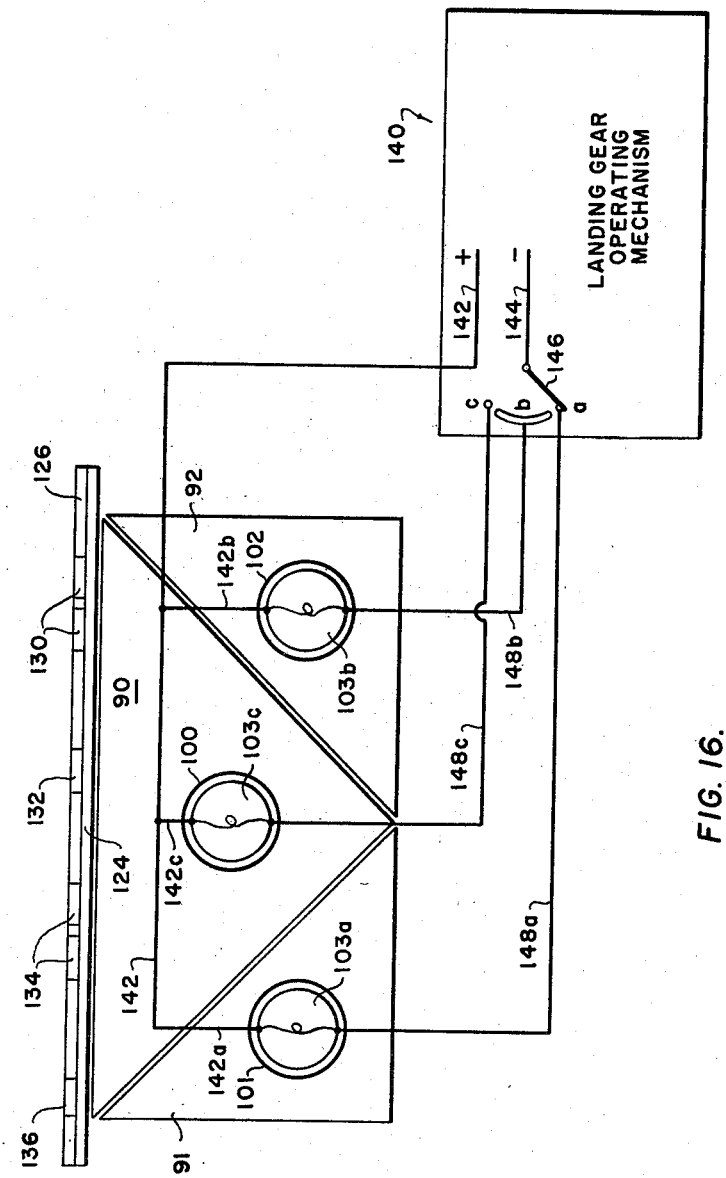
Fig. 16 is a diagrammatic view of the indicator shown in Fig. 14 with the lamps schematically connected to a source of electrical energy.

In Fig. 16 there is schematically shown a manner of connecting the lamps 103 (Fig. 14) to a source of electrical energy and of energizing and deenergizing the lamps in accordance with the position of the landing gear. Referring to Fig. 16, 140 indicates a landing gear operating mechanism, operated in any suitable manner, not shown, and having two sides 142 and 144 of an electric circuit leading therefrom. The side 142 of the circuit is connected to the lamps 103a, 103b and 103c by connectors 142a, 142b and 142c, respectively. The side 144 has a movable switch blade 146 connected thereto for contact with fixed terminals a, b and c, which terminals are connected to the lamps 103a, 103b and 103c by leads 148a, 148b and 148c, respectively. The movable switch blade 146 may be connected to the operating mechanism by suitable means, not shown, and in a manner that the switch is positioned in accordance with the position of the landing gear. That is, when the landing gear is secured, blade 146 is in contact with terminal a and lamp 103a is energized; when the landing gear is in motion, the blade moves across the arcuate terminal b and lamp 103b is energized; and when the landing gear is lowered, blade 146 is in contact with terminal c and lamp 103c is energized.

The operation of the fourth specific embodiment of the invention, illustrated in Figs. 13–16, is generally similar to that of the other embodiments described in detail hereinbefore, except for the more efficient utilization of light by the three-prism, light-transmitting assembly. That is, with reference to Figs. 14 and 16, assuming that the display panel is connected in an electric circuit or circuits for the operating mechanism 140 of the landing gear of an airplane and assuming that the landing gear is SECURED, in this position, switch blade 146 is in control with terminal a and the lamps 103a of prism 91 are energized and those of prisms 90 and 92 are deenergized, so that light rays from the lamps in prism 91 pass through the blue filter 101 in that prism into the prism from whence certain of the rays pass directly through the exit surface 91a and into prism 90, while other light rays are reflected by surfaces 91b and 91c back into prism 91 from whence these rays also pass through exit surface 91a into prism 90. From prism 90, the light rays are transmitted by internal reflection through the sanded, exit surface 90a which the rays are diffuse reflected, collimated and transmitted into the diffusing sheet 124 of the indicia panel. The indicia LANDING GEAR being of neutral or colorless material and the indicia SECURED being of blue material, the light rays which originated from the blue filter 101 in prism 91 are transmitted or passed by the neutral indicia 130 and the blue indicia 132 (Fig. 14) and light rays are blocked or forbidden transmisison by the yellow indicia 134, IN MOTION, and the red indicia 136, LOWERED; thus both the wording LANDING GEAR and the word SECURED are illuminated in blue.

With the landing gear in motion, the switch blade 146 moves across terminal b and the lamps 103b in prism 92 are energized and those in prisms 90 and 91 are deenergized, so that now light rays pass from the lamps in prism 92 through the yellow filter 102, through prism 92 into and through prism 90 to the indicia sheet where now the light rays from the yellow filter are blocked or refused transmission by the blue indicia SECURED and by the red indicia LOWERED and are passed by the neutral indicia LANDING GEAR and by the yellow indicia IN MOTION to thereby illuminate those indicia. Likewise, with the landing gear lowered, the switch blade 146 is in contact with terminal c and the lamps 103c in prism 90 are energized while those in prisms 91 and 92 are deenergized, so that now light rays pass through the red filter 100 into and through prism 90 to the indicia panel where these rays are blocked by the blue indicia SECURED and by the yellow indicia IN MOTION and are passed by the neutral indicia LANDING GEAR and by the red indicia LOWERED to thereby illuminate those indicia.

In each of the illustrated embodiments of the invention, there are a plurality of light sources illustrated as a plurality of lamps, a plurality of optical filter elements of different color characteristics and a plurality of indicium or sets of indicia, with the lamps, filters and indicia variously arranged as to selectively illuminate the the indicia in contrasting colors. There are at least two filter elements of the same color characteristics for each color of indicia to be portrayed or rendered visible from the obverse surface of the indicia panel. The two filter elements for each color may be separate from the indicia as in Figs. 4 and 6, or one of the two filter elements may be incorporated in the indicia as in Figs. 2 and 14. In each of the illustrated embodiments of the invention at least one of the two filters having the same color characteristics is positioned in the light-transmitting panel in a manner that light from the lamp must pass through the one filter before entering the light-transmitting panel and with this arrangement in order to obtain the color contrast at the indicia panel, one lamp or the lamps of one set must be extinguished when the other lamp or set is energized. However the same result may be obtained by having all lamps energized and shifting the filters. For example, in the Figs. 1 and 2 embodiment, in place of the separate red filters 30 and separate blue filters 31, these four filters may be replaced by composite red and blue filters with suitable push-pull shifting mechanism for surrounding the lamps by either the red or the blue component. Also, the cylindrical filters 30 and 31 may be replaced by sheet filters between the light-transmitting panel and the indicia panel with suitable means for shifting the filters in a manner that when it is desired to illuminate ON in red, the red filter is positioned between the light-transmitting panel and the indicia panel; whereas, when it is desired to illuminate OFF in blue, the red filter is removed and the blue filter inserted in its place. Like changes may be made in each of the other illustrated embodiments of the invention. The lamp energizing and deenergizing switch, Fig. 16, is illustrated with only the fourth embodiment of the invention. However, the disclosure is intended to cover a similar, suitable lamp energizing and deenergizing switches for the other embodiments of the invention.

The use of neutral filters is optional with the several embodiments, since the purpose of the neutral filter is to reduce brightness of certain of the indicia. For example, in the embodiment illustrated in Figs. 5 and 6, the neutral filter reduces the brightness of the indicia NO. 1 UNIT which receives light after attenuation by only one color filter to substantially the level of other indicia, such as FIRED, which receives light through two color filters.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. An illuminating device comprising a light-transmitting panel assembly, an indicia panel assembly mounted in front of the light-transmitting panel assembly, said indicia panel assembly having indicia formed thereon and selectively visible from an obverse surface thereof, said light-transmitting panel assembly having particular surface areas thereof for specularly reflecting light rays through the panel and at least one other surface thereof disposed to divert light rays out of said panel and into the indicia panel, a source of light for introducing light rays into the light-transmitting panel assembly for transmission therethrough, and optical color filter means arranged in the path of light transmission between the source of light and the obverse surface of the indicia panel, said optical filter means including a plurality of elements each associated with different indicia on the indicia panel and each having different color filter characteristics for filtering and transmitting light rays of a certain spectral band while blocking light rays of other spectral bands, whereby certain of the indicia are illuminated by light rays of one spectral band and other indicia are illuminated by light rays of another spectral band, in accordance with the filter characteristics of the filters in the path of light transmission between the source of light and the obverse surface of the indicia panel.

2. An illuminating device as set forth in claim 1 wherein the source of light includes at least two lamps and wherein the optical color filter means includes at least two sets each of two color filters with the filters of each set having the same color characteristics, with the filters of different sets having different color characteristics and wherein a first set of filters is located in the path of light transmission between a first of the lamps and a first of the indicia and wherein the second set of filters is located in the path of light transmission between the second lamp and a second of the indicia.

3. An illuminating device as set forth in claim 2 wherein one of the filters of the first set is located between the first of the lamps and the light-transmitting panel and the other filter of the first set is incorported in the first of the indicia, and wherein one of the filters of the second set is located between the second of the lamps and the light-transmitting panel and the other filter of the second set is incorporated in the second of the indicia.

4. An illuminating device as set forth in claim 2 wherein one of the filters of the first set is located between the first of the lamps and the light-transmitting panel and the other filter of the first set is located between the light-transmitting panel and the indicia panel, and wherein one of the filters of the second set is located between the second of the lamps and the light-transmitting panel and the other filter of the second set is located between the light-transmitting panel and the indicia panel.

5. An illuminating device as set forth in claim 4 wherein the other filter of each of the first and second sets is formed with indicia therein.

6. An illuminating device as set forth in claim 1 wherein the light-transmitting panel assembly includes a relatively flat, transparent plate having parallel front and rear surfaces and with light diffusing means incorporated in said rear surface for diffuse reflection of light therefrom through the said front surface.

7. An illuminating device as set forth in claim 1 wherein the light-transmitting panel assembly includes a transparent, rectangular block having parallel front and rear surfaces with light diffusing and collimating means formed on said front surface and with light reflecting means formed on said rear surface.

8. An illuminating device as set forth in claim 1 wherein the light-transmitting panel assembly includes a transparent, rectangular block having parallel front and rear surfaces with light diffusing and collimating means formed on said front surface and with light reflecting means formed on said rear surface, and wherein the rectangular block comprises three triangular prisms each having one plane surface thereof arranged in parallel relation with at least one plane surface of one of the other prisms, the formation and arrangement of the prisms being such that light rays introduced into two of the prisms are transmitted therefrom into the third prism.

9. A duo-panel illumination system comprising a transparent light-transmitting panel and an indicia panel, said indicia panel having an obverse surface thereof visible to an observer and a reverse surface adjacent and parallel to an exit surface of the light-transmitting panel and out of optical contact therewith, a plurality of indicia formed on the indicia panel, said light-transmitting panel having diffuse reflecting means on a surface thereof for reflecting light rays therefrom toward the indicia panel, light means for introducing light rays into the light-transmitting panel for specular reflection of light therethrough and diffuse reflection of light therefrom, and a plurality of color optical filter means of different color characteristics arranged in the path of light transmission between the light means and the obverse surface of the indicia panel for selectively illuminating certain of the indicia in the indicia panel in one specific color and other of the indicia in a different specific color.

10. An illuminating device comprising a transparent light-transmitting panel having parallel front and rear surfaces and an indicia panel having parallel front and rear surfaces, said panels being arranged in juxtaposed relation with the rear surface of the indicia panel positioned adjacent the front surface of the light-transmitting panel in parallel relation thereto and out of optical contact therewith, means for introducting light rays into the light-transmitting panel for transmission therethrough, light diffusing means on the rear surface of the light-transmitting panel for diffuse reflection of light rays through the front surface of such panel and into the indicia panel, indicia means formed on the indicia panel for illumination by the light rays diffuse reflected from the light-transmitting panel, and color filter means incorporated in the light introducing means and in the indicia means for illuminating certain of the indicia in a first band of the color spectrum and for illuminating other of the indicia in a second and distinctly different band of the color spectrum.

11. An illuminating device as set forth in claim 10 wherein the light introducing means includes at least two lamps, wherein the color filter means includes a first color filter positioned between a first of the lamps and the light-transmitting panel for introducing light rays of the first spectral band into the light-transmitting panel and a second color filter positioned between a second of the lamps and the light-transmitting panel for introducing light rays of the second spectral band into the light transmitting panel, wherein certain of the indicia are constructed of a material operative to transmit light rays of the first spectral band and to inhibit transmission of light rays of the second spectral band, and wherein other of the indicia are constructed of a material operative to transmit light rays of the second spectral band and to inhibit transmission of light rays of the first spectral band.

12. An illuminating device as set forth in claim 11 wherein the indicia are formed of discrete pieces of filter material of different color characteristics inlaid within the indicia panel.

13. An illuminating device as set forth in claim 11 wherein the light introducing means includes means for selectively energizing one of the first and second of the lamps while deenergizing the other of such lamps.

14. A duo-panel illumination system comprising a transparent light-transmitting panel and an indicia panel, said indicia panel having an obverse surface thereof visible to an observer and a reverse surface adjacent and parallel to a light exit surface of the light-transmitting panel and out of optical contact therewith, a plurality of indicia formed on the indicia panel, said light-transmitting panel having means on a surface thereof for diverting light rays therefrom toward the indicia panel, light means for introducing light rays into the light-transmitting panel for specular reflection of light therethrough and diversion of light therefrom, a plurality of optical color filter means of different color characteristics arranged in paths of light transmission between the light means and the obverse surface of the indicia panel for selectively illuminating certain of the indicia in the indicia panel in one specific color and other of the indicia in a different specific color, and means included in the light means and in the filter means for selectively rendering certain only of the indicia visible from the obverse surface of the indicia panel.

15. A duo-panel illumination system as set forth in claim 14 wherein the means for rendering certain only of the indicia visible includes an arrangement of the plurality of filter means wherein a pair of optical color filters of the same light transmitting characteristics is arranged in a path of light transmission between the light means and the obverse surface of the indicia panel for transmission of light rays of a certain band of the visible spectrum and a pair of optical color filters each of different light transmitting characteristics arranged between the light means and the obverse surface of the indicia panel for absorbing substantially all other light rays emitted by the light means.

16. A duo-panel illumination system as set forth in claim 14 wherein the light means includes a plurality of lamps and wherein the means for rendering certain only of the indicia visible includes a switch for energizing certain of the plurality of lamps and for deenergizing other of the plurality of lamps.

17. An indicia panel structure for use with an illuminating device, said structure comprising a plurality of optical color filters arranged in superimposed relation, each of said filters individually possessing light-transmitting characteristics with the transmitting characteristics of each filter being limited to a specific band of the visible spectrum and with the specific bands differing for each filter whereby when so superimposed substantially all visible light introduced into the panel is absorbed and refused transmission through the panel, and each of said filters being formed with openings therein, which openings are arranged in a manner that light rays of the specific band for a given filter are transmitted through that filter to an obverse surface of the panel, whereas light rays of other bands are refused transmission.

References Cited in the file of this patent

UNITED STATES PATENTS

| | | |
|---|---|---|
| 2,295,301 | Smith | Sept. 8, 1942 |
| 2,374,408 | Braidwood | Apr. 24, 1945 |
| 2,623,313 | Fuchs | Dec. 30, 1952 |